(12) United States Patent
Yau

(10) Patent No.: US 8,342,846 B2
(45) Date of Patent: Jan. 1, 2013

(54) BRAILLE WRITING DEVICE CAPABLE OF PROCESSING INFORMATION

(75) Inventor: Yimwai Yau, Guangdong (CN)

(73) Assignee: Shenzhen Wang Ling Science and Technology Development Co., Ltd., Shenzhen, Guangdong (CN)

( * ) Notice: Subject to any disclaimer, the term of this patent is extended or adjusted under 35 U.S.C. 154(b) by 1147 days.

(21) Appl. No.: 11/817,199

(22) PCT Filed: Feb. 21, 2006

(86) PCT No.: PCT/CN2006/000252
§ 371 (c)(1),
(2), (4) Date: Sep. 11, 2008

(87) PCT Pub. No.: WO2006/089477
PCT Pub. Date: Aug. 31, 2006

(65) Prior Publication Data
US 2009/0004632 A1    Jan. 1, 2009

(30) Foreign Application Priority Data

Feb. 28, 2005    (CN) .......................... 2005 1 0033298

(51) Int. Cl.
*G09B 21/02* (2006.01)
(52) U.S. Cl. ........ 434/115; 434/113; 434/116; 434/117; 434/126
(58) Field of Classification Search .................. 434/112, 434/113, 115
See application file for complete search history.

(56) References Cited

U.S. PATENT DOCUMENTS

| 5,133,664 | A | * | 7/1992 | Hawk et al. | ................... | 434/115 |
| 5,725,379 | A | * | 3/1998 | Perry | ............................. | 434/113 |
| 6,417,821 | B1 | * | 7/2002 | Becker et al. | ................... | 345/31 |
| 2004/0197745 | A1 | * | 10/2004 | Hong et al. | ................... | 434/113 |

FOREIGN PATENT DOCUMENTS

| CN | 2646806 | 6/2004 |
| CN | 2645155 | 9/2004 |
| WO | WO 0062269 | 10/2000 |

* cited by examiner

*Primary Examiner* — Xuan Thai
*Assistant Examiner* — Banafsheh Hadizonooz
(74) *Attorney, Agent, or Firm* — Reising Ethington P.C.

(57) ABSTRACT

A Braille writing device capable of processing information, comprises a motherboard (10) including a plurality of Braille cells (11) arranged in rows and columns, each cell consists of six dot-shaped recesses or pinholes, a sub-board (20) is configured to be inserted into a flute (12) being provided at each of left and right margins of the motherboard and moveable along the flute, a plurality of marks (13) are provided on an outer surface of the flutes (12), and a detent member (30) is formed between each two of the marks (13) in the inner side of the flute (12) and configured to prevent the moveable sub-board from being moved during writing. A Braille information processor (40) is fixed on a concave formed on the backside of the motherboard (10), comprising a circuit board (41), a central processing unit (42), a plurality of Braille trigger switch groups (44) each of which consists of six trigger switches (43), and an infrared transmitter (45). The Braille information processor can be coupled to a PDA or computer.

3 Claims, 11 Drawing Sheets

A-A

BRAILLE WRITING DEVICE CAPABLE OF PROCESSING INFORMATION

FIELD OF THE INVENTION

The present invention relates to a Braille writing device, more particularly, to a Braille writing device capable of processing information, by which the input Braille can be translated into electronic information signals for processing, storing and speaking. The device facilitates the writing skill of the Braille.

BACKGROUND OF THE INVENTION

The blind including sightless and asthenopic persons are the weakest handicapped persons and need education to improve their life abilities. Conventional educations designed for the blind do not provide any effective methods to aim at the asthenopic persons having limited sight. Thus, those asthenopic persons have to learn Braille like those blinds who are totally sightless. Recently, some special education methods in view of asthenopic persons are desirable and those asthenopic persons are encouraged to use their limited sight to learn normal characters, instead of Braille, using magnifying glasses, cable television system with magnifying function, telescopes and special reading glasses or the like. However, since it is quite easy to feel tired to use eyes for reading, appropriate reading methods and devices are needed.

Braille is a type of symbols each of which consists of six projected dots. The basic structure of the international standard Braille consists of six projected dots (( ⠇ ⠸ )). When writing, a sheet of Braille paper is attached to a Braille plate on which circular doted-recesses are formed and using a Braille stylus to press the corresponding points of the recesses to form projections on the paper. When reading, the paper should be reversed. If any error is found, the correction of the error is time-cost and the process of the correction is complicated. A conventional Braille plate consists of a top board and a bottom board which are hinged with each other on one side. A sheet of Braille paper between the two boards is "written" with a Braille stylus through rectangular openings formed on the top board and circular recesses formed on the bottom board to form projections on the sheet of paper. Those projections arranged in light of the Braille rules can be touched by hands for reading. Such Braille writing device is costly. And, it is very hard to fix the paper on the device.

On the other hand, listening is the best choice for the blind to "read". However, none of the Braille writing devices is able to provide such functions like processing the input Braille and outputting the input Braille by speaking. Recently, computers and palmtops called PDA are widely used in our life so that it is possible to incorporating the electronic technology and computer technology into a Braille writing device.

SUMMARY OF THE INVENTION

To overcome the shortcomings of the prior art, a Braille writing device capable of processing information is provided according to the present invention. The device is able to translate Braille into electronic information signals for processing, storing and speaking. The device facilitates the Braille writing by stabilizing the placement of Braille paper.

The present invention provides a Braille writing device capable of processing information, comprising a board-shaped motherboard provided with a number of Braille cells arranged in rows and columns, each of the cells consisting of six dot-shaped recesses; a flute being provided at each of left and right margins of the motherboard and standing out on a surface of the motherboard; a moveable sub-board configured to be inserted into the flute and moveable along the flute; a plurality of marks and a plurality of row tabs standing out on an outer surface of the flutes, a spacing between each two of the marks being corresponding to a width of the movable sub-board; and a detent member formed between each two of the marks in the inner side of the flute and configured to prevent the moveable sub-board from being moved during writing.

Four poles configured to hold Braille paper are provided respectively at four corners of a front side of the motherboard.

The moveable sub-board is in the form of a strip board and includes a plurality of through-holes arranged in rows and columns, each through-hole is corresponding to one of the Braille cells of the Braille motherboard, a spacing between two rows of the through-holes on the sub-board is a double of that between two rows of the Braille cells on the motherboard and the columns of the through-holes are corresponding to those of the Braille cells on the motherboard one by one, a width of an upper margin above the first row of the through-holes on the moveable sub-board is arranged to be equal to a height of one row of the through-holes and the width of a lower margin below the last row of the through-holes is to be equal to the height of two rows, a plurality of column tabs are projected outwardly from the upper and lower margins on the moveable sub-board, an L-shaped flange with the shape corresponding to that of the flutes of the motherboard is provided on each of shorter edges of the moveable sub-board, and a plurality of hollows are provided on a backside of shorter edges of the moveable sub-board.

The L-shaped flanges are configured to be inserted into the flutes and be released therefrom, so that, after the sub-board is turned for 180° clockwise or counter clockwise, the rows of the sub-board are aligning to those rows of the motherboard which were covered before the sub-board is turned.

The detent member comprises an opening formed on the motherboard, a ball filled into the opening and being movable axially along the opening, a spring being arranged behind the ball, and plate being posited at a backside of the motherboard to seal the opening, wherein the opening is provided with a diameter slightly smaller than that of the ball so that the ball cannot be pushed out by the spring but a part of the ball can be extended from the opening, the ball can be partially embedded into one of the hollows of the moveable sub-board to hold the moveable sub-board when the moveable sub-board is sliding to a proper position.

The present invention also provides a Braille writing device capable of processing information, comprising a board-shaped Braille motherboard provided with a number of Braille cells arranged in rows and columns, each of the cells consisting of six dot-shaped pinholes, a flute being provided at each of left and right margins of the motherboard and standing out on a surface of the motherboard; a moveable sub-board configured to be inserted into the flute and moveable along the flute; a plurality of marks and a plurality of row tabs standing out on an outer surface of the flutes, a spacing between each two of the marks being corresponding to a width of the movable sub-board; a detent member formed between each two of the marks in the inner side of the flute and configured to prevent the moveable sub-board from being moved during writing; and a Braille information processor attached to a backside of the motherboard and configured to be coupled to a computer.

The Braille information processor is provided with a circuit on which an array consisting of a plurality of trigger switch groups are provided, each trigger switch group including a plurality of trigger switches which are corresponding to each of the six dot-shaped pinholes of one cell on the Braille motherboard, respectively, and connect with a CPU which is configured to process digital information signals representing Braille in an order that the CPU starts to read data from the first Braille trigger switch group at a right end of each row, namely, scanning each of the groups from upper to lower of one column and from right column to left column in one group.

The processor is further provided with an infrared port and an output terminal both of which may be arranged at a sidewall of the Braille motherboard.

The moveable sub-board is in the form of a strip board and includes a plurality of through-holes arranged in rows and columns, each through-hole is corresponding to one of the Braille cells of the Braille motherboard, a spacing between two rows of the through-holes on the sub-board is a double of that between two rows of the Braille cells on the motherboard and the columns of the through-holes are corresponding to those of the Braille cells on the motherboard one by one, a width of an upper margin above the first row of the through-holes on the moveable sub-board is arranged to be equal to a height of one row of the through-holes and the width of a lower margin below the last row of the through-holes is to be equal to the height of two rows, a plurality of column tabs are projected outwardly from the upper and lower margins on the moveable sub-board, an L-shaped flange with the shape corresponding to that of the flutes of the motherboard is provided on each of shorter edges of the moveable sub-board, and a plurality of hollows are provided on a backside of shorter edges of the moveable sub-board.

The detent member comprises an opening formed on the motherboard, a ball filled into the opening and being movable axially along the opening, a spring being arranged behind the ball, and plate being posited at a backside of the motherboard to seal the opening, wherein the opening is provided with a diameter slightly smaller than that of the ball so that the ball cannot be pushed out by the spring but a part of the ball can be extended from the opening, the ball can be partially embedded into one of the hollows of the moveable sub-board to hold the moveable sub-board when the moveable sub-board is sliding to a proper position.

The present invention not only improves the structure of conventional Braille writing device but also incorporates the electronic technology into the Braille writing field, so as to facilitate the Braille writing and realize the electronization and computerization of Braille. According to the present invention, the blind can not only write but also communicate with other electronic devices like computers and palmtops, realizing the storage and speaking of Braille. The device according to the invention can effectively improve blinds' education, enhance the efficiency of learning Braille and reduce the cost of the education.

BRIEF DESCRIPTION OF THE DRAWINGS

FIG. 1 is a schematic diagram of the Braille writing device according to embodiment 1 of the present invention, wherein

FIG. 3 is a schematic diagram of the motherboard according to the present invention, wherein

FIG. 4 is a schematic diagram of the moveable sub-board according to the present invention, wherein

FIG. 5 is a schematic diagram of a detent member according to the present invention, wherein

FIG. 6 is a schematic diagram of the device according to the embodiment 2 of the present invention, wherein FIG. 7 is a schematic view showing examples of the present invention designed in the form of a "book" with a PDA, wherein

DESCRIPTION OF THE PREFERRED EMBODIMENTS

The present invention will be illustrated in detail with reference to the following embodiments but is not limited to the embodiments.

Embodiment 1

Figure 1A:
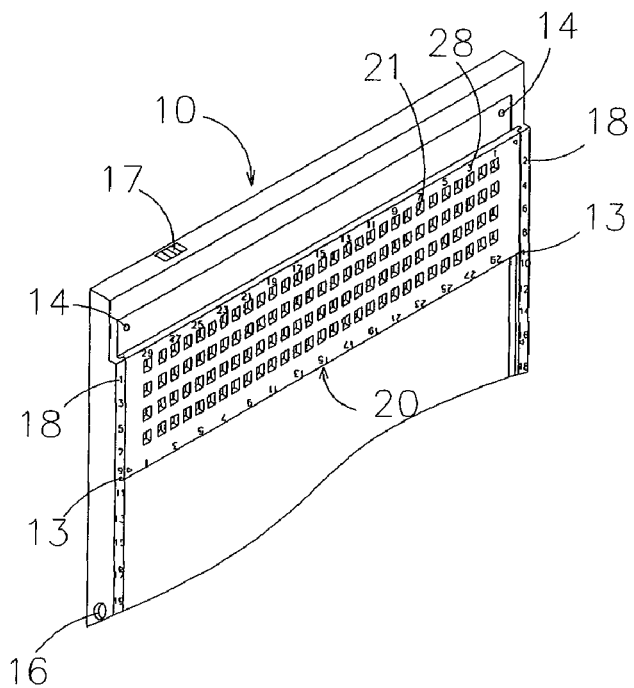
FIG. 1A shows schematically a moveable sub-board being attached to a motherboard.
Figure 1B:
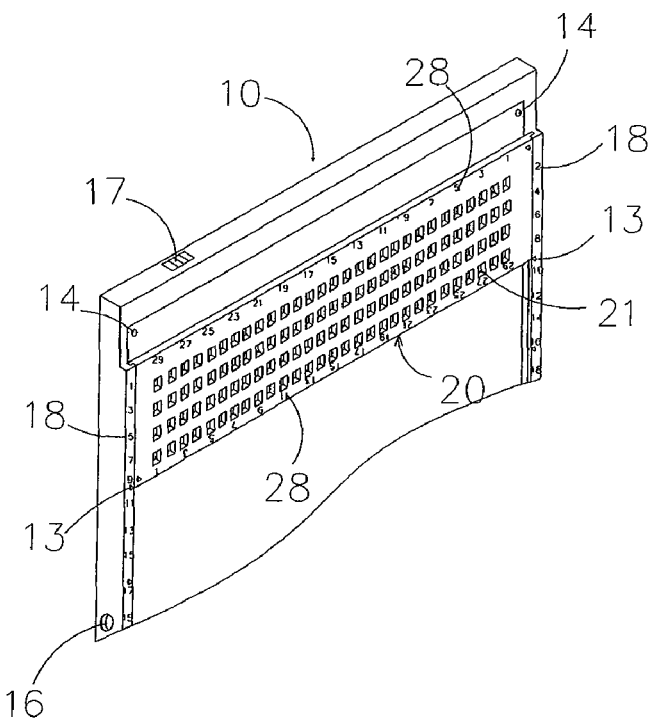
FIG. 1B shows that the sub-board is reversed for 180° clockwise or counter clockwise.
Figure 2:
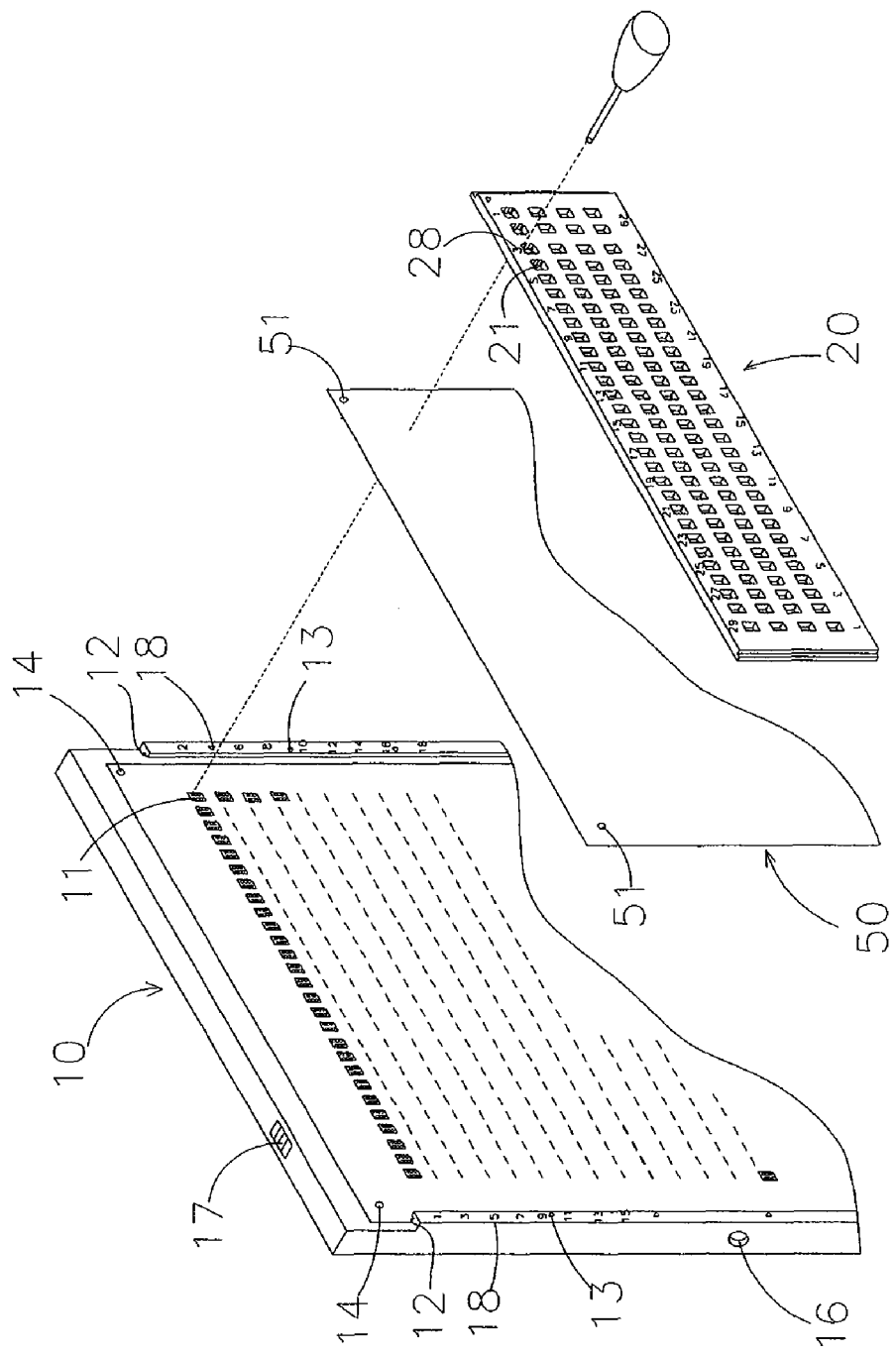
FIG. 2 is a partially exploded perspective view according to the embodiment 1 of the present invention.
Figure 3A:
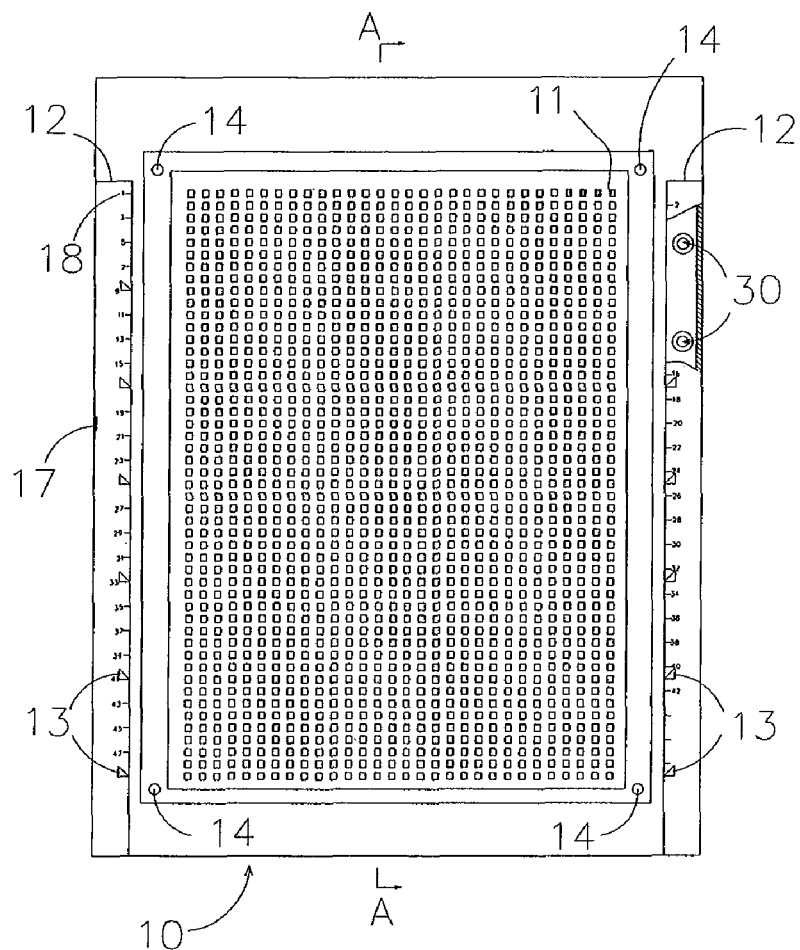
FIG. 3A is a front view.
Figure 3B:
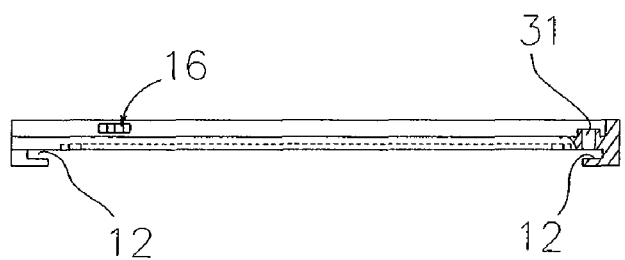
FIG. 3B is a top view of the FIG. 3A.
Figure 3C:
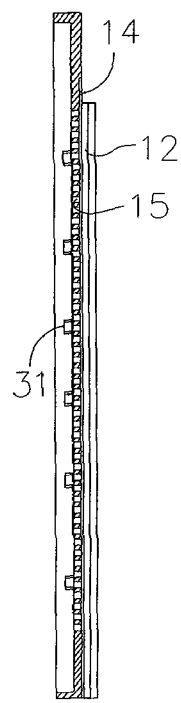
FIG. 3C is a side view of the FIG. 3A
Figure 3D:
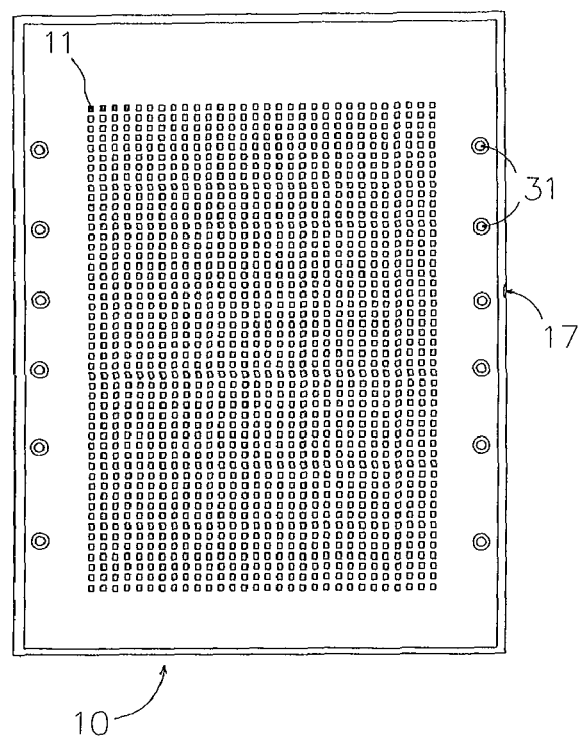
FIG. 3D is a rear view of the FIG. 3A.
Figure 4A:
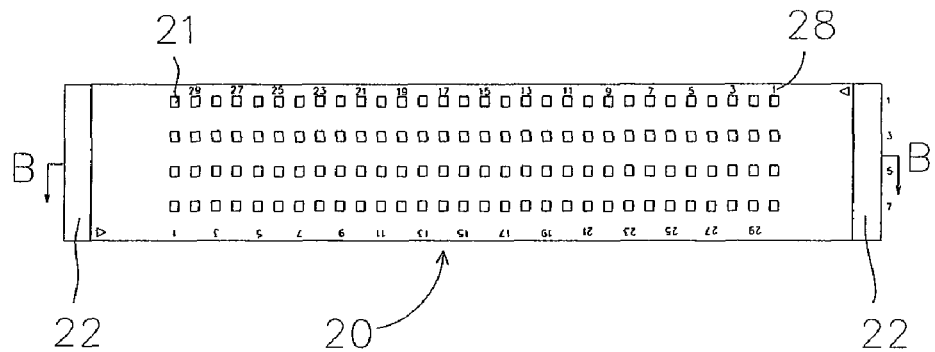
FIG. 4A is a front view.
Figure 4B:
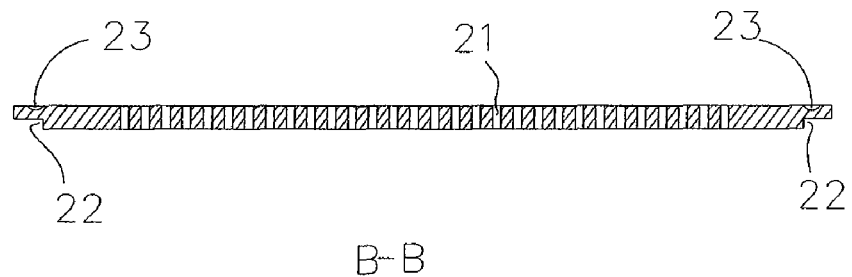
FIG. 4B is a top view of the FIG. 4A
Figure 4C:
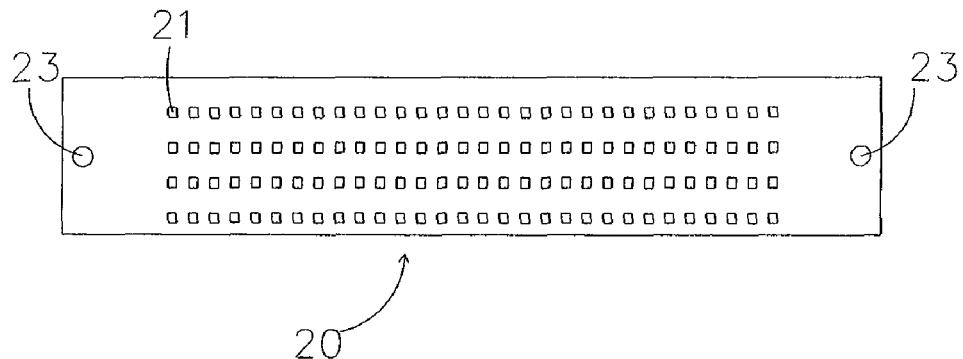
FIG. 4C is a rear view of the FIG. 4A.
Figure 5A:
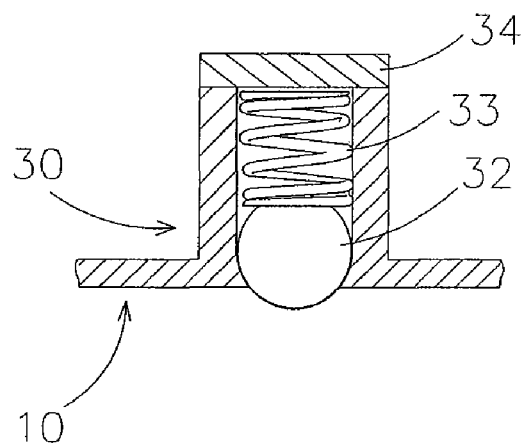
FIG. 5A is a cross-sectional view and FIG. 5B is a partially exploded schematic view.
Figure 5B:
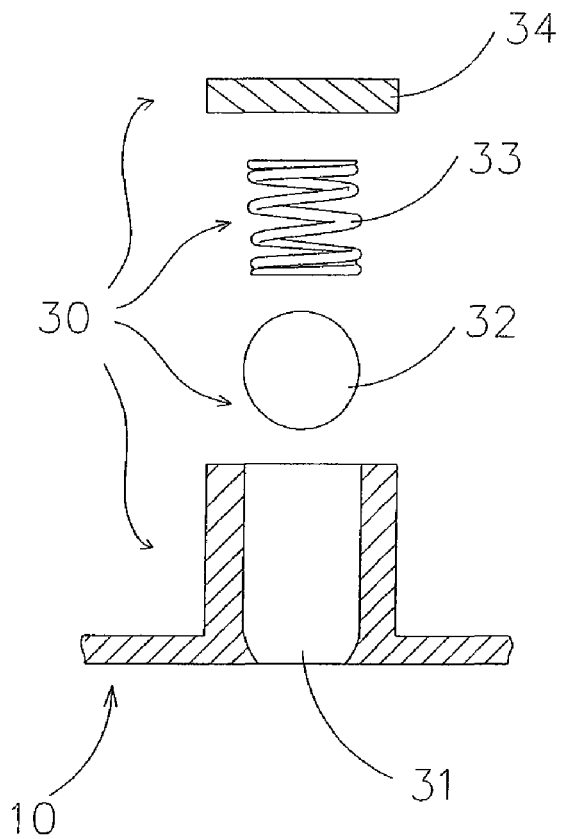

Referring to FIGS. 1A, 1B and FIG. 2, the present invention provides a Braille writing device capable of processing information, comprising a motherboard 10 and one or several moveable sub-boards 20. The motherboard 10 as shown in FIGS. 3A-3D is a rectangular board with a size slightly larger than that of B5 paper and includes a number of Braille cells 11 arranged in rows and columns thereon. The size and arrangement rules of the Braille cells are conventional, namely, each cell consisting of six dot-shaped recesses ((⋮ ⋮)) arranged in three rows and two columns. A flute 12 is provided at each of left and right margins of the motherboard, respectively, as shown in FIGS. 3B and 3C, and stand out from the front surface of the motherboard. In the embodiment, the flute 12 is in the form of L-shaped. As shown in FIGS. 1A, 1B, 2 and 3A, a plurality of marks 13 and a plurality of row tabs 18 are respectively standing out on the front surface of the flutes 12, wherein a spacing between two of the marks 13 is corresponding to the width of a movable sub-board 20 so that each of marks is able to position the central point of a vertical edge of the moveable sub-board. The plurality of row tabs 18 are corresponding to the rows which are formed on the moveable sub-boards as explained below. As shown in FIGS. 2 and 3A, four poles 14 with a height slightly larger than the thickness of a sheet of Braille paper are provided respectively at four corners of the motherboard 10 in order to hold Braille paper. Four punch holes 51 are formed respectively at four corners of each sheet of Braille paper 50 in corresponding to the four poles 14 so that each of the punch holes 51 can accommodate a corresponding pole 14 so as to fixedly attach a sheet of paper to the motherboard. The moveable sub-board 20 mentioned above is inserted into the flutes 12 of the motherboard 10 and is moveable along the flutes 12. The structure of the moveable sub-board 20 is shown in FIGS. 4A to 4C. The moveable sub-board 20 is in the form of a strip board and includes a plurality of through-holes 21 arranged in rows and columns (FIGS. 2, 4A and 4B). Each through-hole 21 is corresponding to one of Braille cells 11 of the motherboard 10. The spacing between two rows of the through-holes 21 on the sub-board 20 is a double of the spacing between two rows of the Braille cells on the motherboard, namely, rows 1, 2, 3, 4, etc. on a sub-board are respectively corresponding to rows 1, 3, 5, 7, etc. on a motherboard. The columns of the through-holes 21 on the moveable sub-board are corresponding to those of the Braille cells 11 on the motherboard 10 one by one. In the embodiment, there are four rows of the through-holes. In order to improve the usage effectiveness of Braille paper, as shown in FIG. 4A, the width of an upper margin which occurs above the first row of the through-holes 21 is arranged to be equal to the height of one row of the through-holes 21 of the sub-board 20 and the width of the lower margin which occurs below the last row of the through-hole 21 is to be equal to the total height of two rows of the through-holes 21. When one side of a sheet of paper is full with writing, the other side of the same sheet could be used again by turning the sub-board to 180° clockwise or counter clockwise. After turning the sub-board 20, the lower margin is switched to the upside (referring to FIG. 4C) such that the rows of the through-holes 21 are respectively corresponding to those rows of the Braille cells which were covered before the sub-board 20 is turned, namely, the rows 1, 2, 3, 4, etc. of the moveable sub-board are respectively corresponding to the rows 2, 4, 6, 8, etc. on the motherboard. As shown in FIGS. 3B and 4B, an L-shaped flange 22 is formed on each of left and right edges of the moveable sub-board and is configured to be inserted into the flutes 12 and released therefrom, so that each sheet of Braille paper could be used two times as mentioned above by turning the sub-board for 180° and by reversing the paper. As shown in FIG. 4B, a plurality of hollows 23 are provided on the backside near to the left and right edges of the moveable sub-board. A detent member 30 is provided on the motherboard between each two marks 13 and configured to prevent the moveable sub-board 20 from being moved in the process of writing, as shown in FIGS. 5A and 5B. The detent member 30 comprises an opening 31 formed on the motherboard 10 (referring to FIGS. 3A to 3D), within which a ball 32 is filled and a spring 33 is arranged behind the ball 32. Since the diameter of the opening is designed to be slightly smaller than that of the ball 32, the ball cannot be pushed out by the spring but a portion of the ball can be extended from the opening 31. When the moveable sub-board 20 is sliding to a proper position, the ball 32 may be embedded into one of the hollows 23 of the moveable sub-board to hold the moveable sub-board. A plate 34 is mounted on the backside of the motherboard to seal the opening.

The usage of the Braille writing device is illustrated with reference to FIG. 2. A sheet of Braille paper is placed on the motherboard 10 by putting the poles 14 of the motherboard 10 to pass through the corresponding punch holes 51 of paper so as to fix paper on the motherboard 10. Then, the moveable sub-board 20 is inserted into the flutes 12 and positioned by using one corresponding detent member 30. Thus, Braille writing can be done by using a Braille stylus to, through each of the through-holes 21, touch the desired recesses of the six dot-shaped recesses ((┊ ┊)) of a cell 11. After writing in four rows on the moveable sub-board 20 are completed, the sub-board is moved downwards along the flutes 12 to the next position at which the next detent member 30 holds the sub-board by having the ball 32 engaging in the hollow 23. In this way, the user can write over one side of a sheet of Braille paper in turn. Subsequently, turning the sub-board 20 for 180° clockwise or counter-clockwise, and reversing the paper to the other side, the user can write on the other side of the same sheet of paper.

If an error is found, it is easily to correct the error according to the position of the error by means of row tabs 18 which represents the position of each row of a writing page and column tabs 28 which are formed on the sub-board and represents the position of each column of the same writing page.

Embodiment 2

The following embodiment shows an example of the Braille writing device with a function of processing information.

Figure 6A:
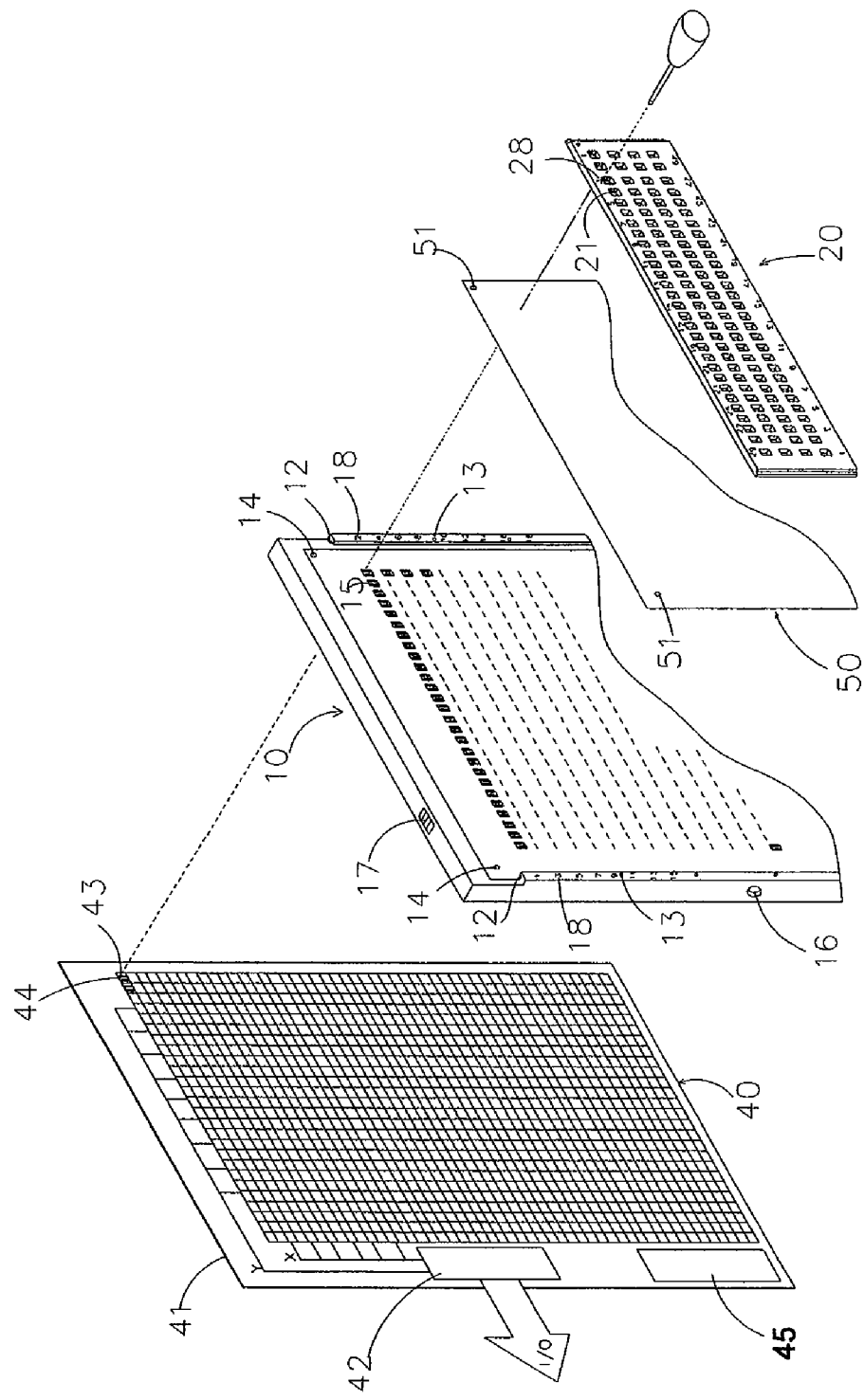
FIG. 6A is a partially exploded perspective view.
Figure 6B:
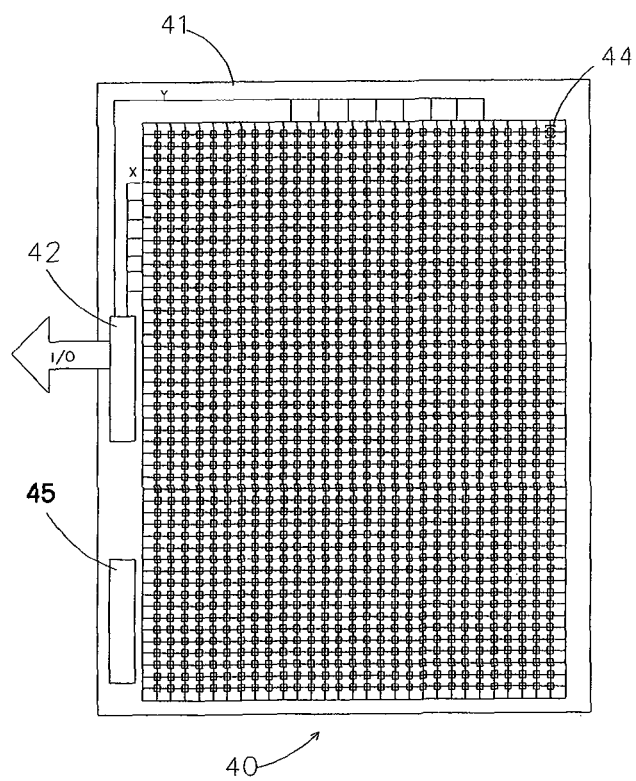
FIG. 6B is a front view.
Figure 6C:
FIG. 6C is a side view of the FIG. 6B

The basic structure of the device in the embodiment is the same as that in first embodiment, except for the difference as shown in FIGS. 6A to 6C. A Braille information processor 40 is fixed on a concave formed on the backside of the motherboard 10 by bolts (referring to FIG. 6C), comprising a circuit board 41, a central processing unit (CPU) 42, a plurality of Braille trigger switch groups 44 each of which consists of six trigger switches 43, and an infrared transmitter 45. Each cell 15 of the motherboard 10 consists of six dot-shaped pinholes, rather than six dot-shaped recesses ((┊ ┊)) as mentioned in the first embodiment so that the Braille stylus can pass through the pinholes to touch the trigger switches 43. As shown in FIGS. 6A, 6C, 6D and 6E, each of trigger switches 43 corresponding to each of the six dot-shaped pinholes of one cell 15, respectively, connects to the CPU 42. Each Braille trigger switch group 44 is made up of six trigger switches 43. An array of Braille trigger groups 44 is formed. In the embodiment, X and Y respectively denote the rows and columns of the array. Thus, six trigger switches 43, from right to left and from upper to lower, of each trigger switch group 44 can be respectively denoted as X1-Y1, X2-Y1, X3-Y1, X1-Y2, X2-Y2 and X3-Y2. Digital signals representing the input Braille information is processed by the CPU 42. The CPU 42 starts to read data from the first Braille trigger switch group 44 at the right end of each row, namely, scanning each of group from upper to lower of one column and from right to left one column by one column. The trigger switches may employ those known technologies available in PDA or the like.

When the Braille stylus passes through one of dot-shaped pinholes of a cell 15 of the motherboard 10, it touches a corresponding trigger switch 43 to generate a change of level (high or low). The CPU 42 scans the trigger switches groups 44 from right to left of each row of cells 15. As to one group, the scan is done from upper to lower of the right column and then the left column. After the scanning, the CPU 42 obtains signals representing the level of each switch, and then transmits the signals to a PDA 64 or the like through an I/O port or the infrared transmitter 45 for storing the information and outputting the information by speech.

Figure 6D:
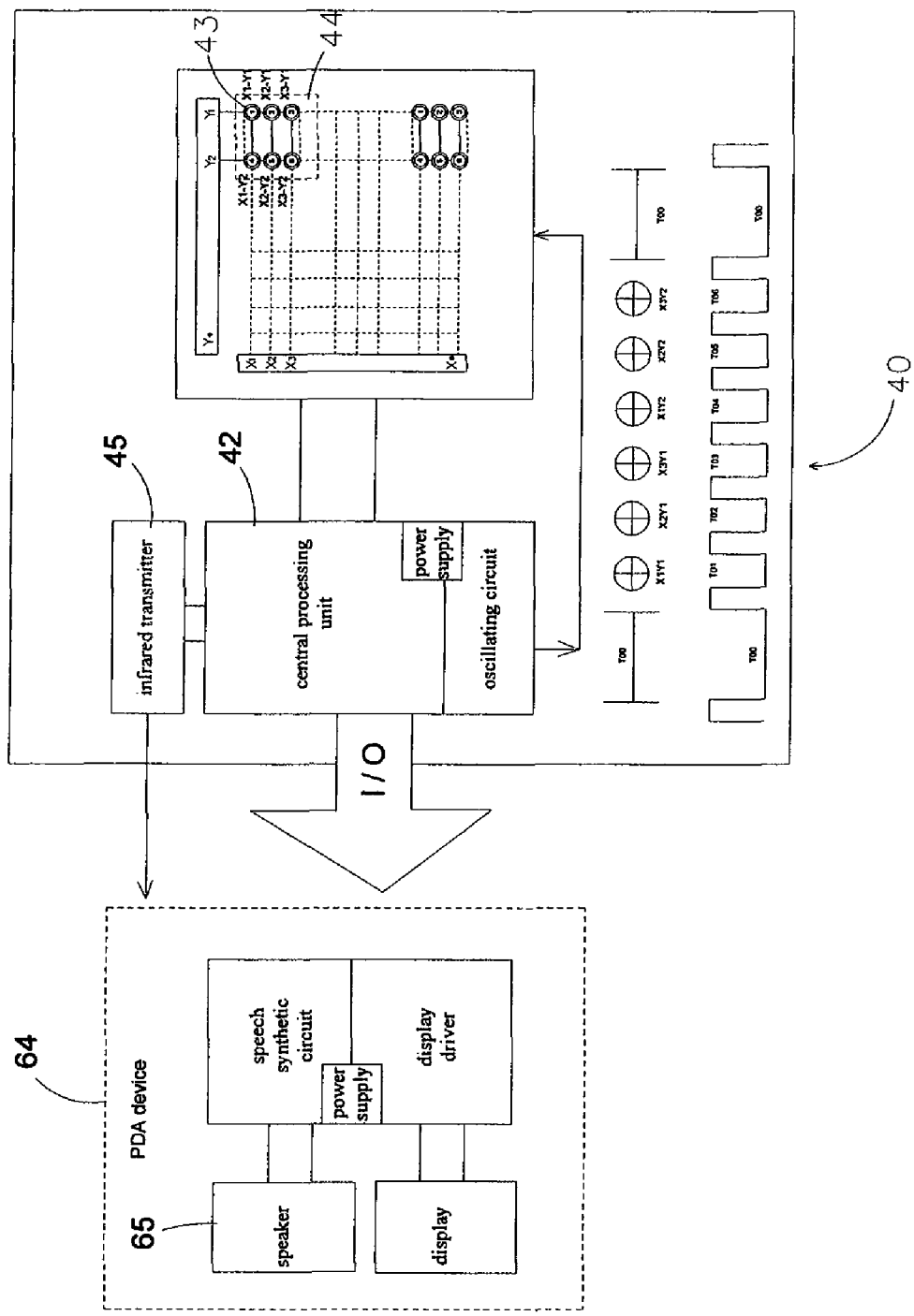
FIG. 6D shows schematically a block diagram of the circuit to be employed.

As shown in FIG. 6D, the CPU 42 of the Braille information processor 40 scans Braille trigger switch groups 44 in turn to generate pulse signals T01 to T06 in corresponding to six trigger switches 43 of one trigger switch group and T00. According to the structure of Braille, six points are arranged in two columns, each of which has three points ((┊ ┊)). Those in the left column are defined as Point 1, 2 and 3 from top to bottom, and those in the right are defined as Point 4, 5 and 6 from top to bottom. Thus, data is read in the order from the right column to the left column, and from upper to lower of each column (the order for writing is different from that for reading), namely, the order of X1-Y1, X2-Y1, X3-Y1, X1-Y2, X2-Y2, X3-Y2, X1-Y3, X2-Y3, X3-Y3, X1-Y4, X2-Y4, X3-Y4, . . . , the second row X4-Y1, X5-Y1, X6-Y1, X4-Y2, X5-Y2 and X6-Y2, . . . . In this way, reading the information of Braille trigger switch groups 44 by the CPU 42 will not be impacted by different orders of writing. The T00 is a periodical interval in the process of reading the information, the length of which can be adjusted by the CPU 42. In order to satisfy the requirements of blinds with various backgrounds and operate the device easily, the CPU 42 can adjust the length of the interval T00 in considering any of the following conditions:

1. the interval may be equal to the time period of completing one Braille trigger switch group 44 consisting of six independent trigger switches.
2. the interval may be equal to the time period of completing one row of through-holes 21 on the moveable sub-board.
3. the interval may be equal to the time period of completing several rows of through-holes 21 on the moveable sub-board.

Various keys required for processing information may be provided to connect with the CPU. If any error is found in a Braille trigger switch group 44, the position of the group 44 in which the error occurs can firstly be determined according to the row tabs 18 on the motherboard and column tabs 28 on the moveable sub-board. After then, the CPU 42 receives an instruction from a user to reset the voltage of the six trigger switches 43 of the Braille trigger switch group 44.

As shown in FIG. 6A, an infrared outlet 16 is provided on the sidewall of the concave plane on the backside of the motherboard 10 in corresponding to the infrared transmitter 45. An output terminal 17 of the Braille information processing device is provided on the top of the motherboard 10.

Embodiment 3

Figure 7A:
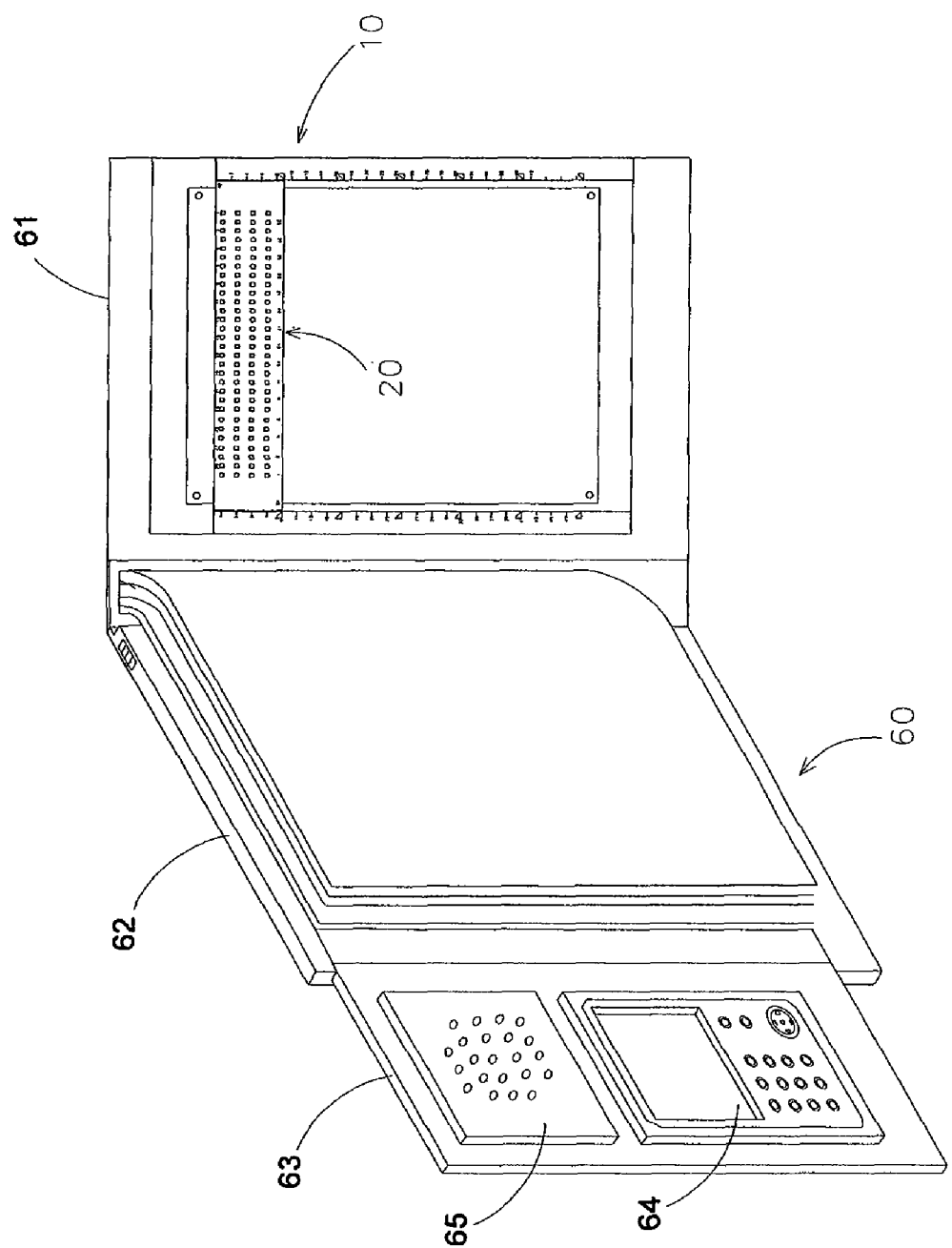
FIG. 7A shows example 1 and FIG. 7B shows example 2.
Figure 7B:
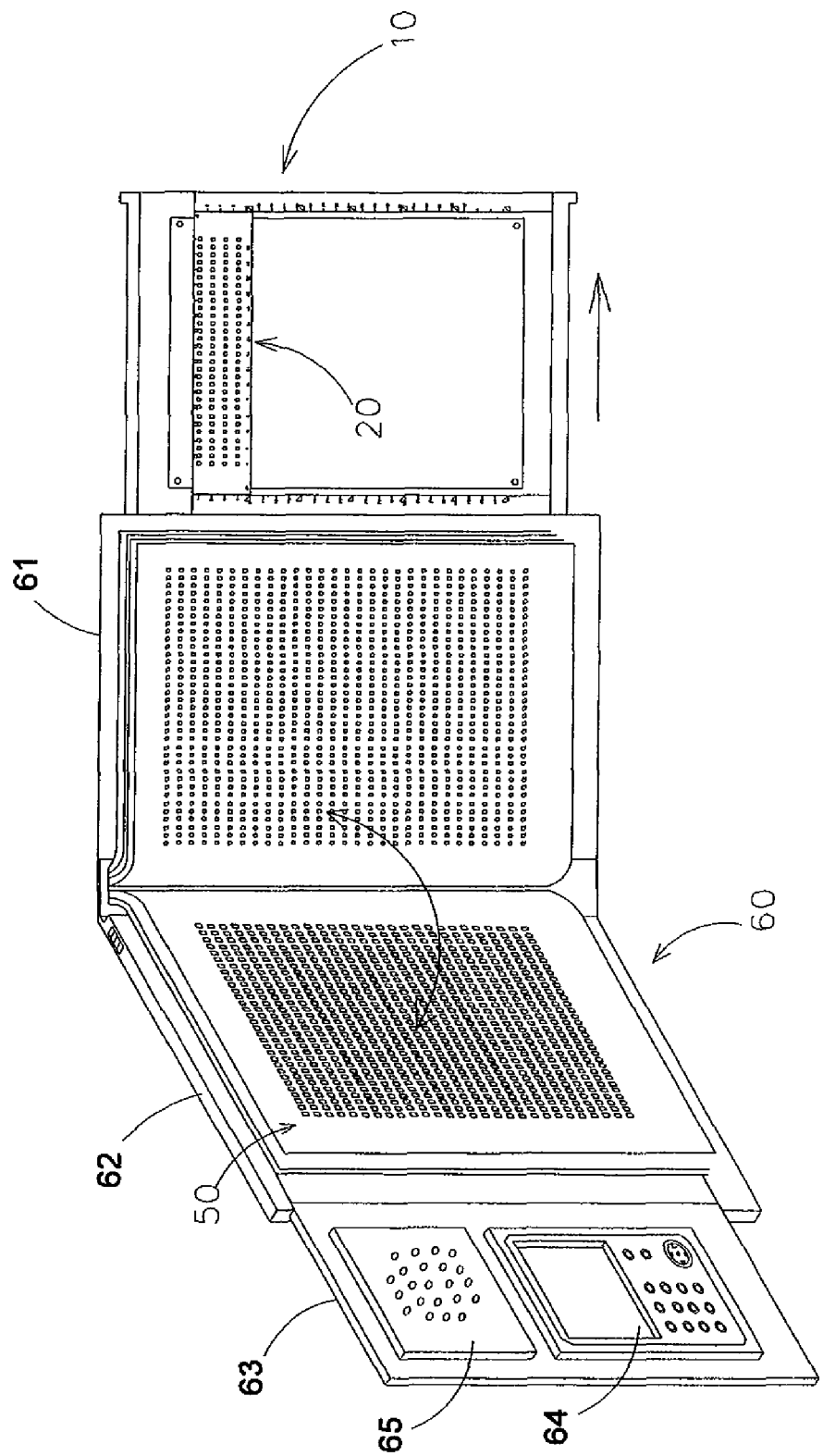

The device of the present invention can be designed like a "book" 60, as shown in FIGS. 7A and 7B. FIG. 7A shows that the Braille writing device of the present invention is attached to the back cover 61 of the "book". FIG. 7B shows that a board 63 which can be extracted from the cover page 62 of the "book" is provided with the cover page 62. A PDA device 64 and a speaker 65 are mounted on the board. Information data processed by the Braille information processor 40 are transmitted to the PDA device 64 through the infrared transmitter 45 in a real time, and an audio signal is generated to output through the speaker 65.

The invention claimed is:

1. A Braille writing device capable of processing information, comprising
   a board-shaped motherboard (10) provided with a number of cells (11) arranged in rows and columns, each of the cells (11) consisting of six dot-shaped recesses;
   two flutes (12) being provided near to two vertical sides of the motherboard (10), respectively, in a form of standing out from a front surface of the motherboard (10);
   a moveable sub-board (20) configured to be inserted between the two flutes (12) and moveable along the flutes;
   a plurality of marks (13) being projected from an outer surface of the flutes (12) with a spacing between each of two marks (13) equal to a width of the movable sub-board (20);
   a plurality of row tabs (18) being projected from the outer surface of the flutes (12); and
   a plurality of detent members (30) being provided on the motherboard and configured to prevent the moveable sub-board from being moved during writing;
   wherein the moveable sub-board (20) includes a plurality of through-holes (21) arranged in rows and columns, each through-hole (21) is corresponding to one of the cells (11), a spacing between each of two rows of the through-holes (21) is a double of that between each of two rows of the cells (11) and the columns of the through-holes (21) are corresponding to those of the cells (11) one by one, a width of an upper margin above a first row of the through-holes (21) is arranged to be equal to a height of one row of the through-holes (21) and a width of a lower margin below a last row of the through-holes (21) is to be equal to a total height of two of the rows of the through-holes (21), a plurality of column tabs (28) are projected outwardly from the upper and lower margins on the moveable sub-board (20), a L-shaped flanges (22) is provided at each of the shorter edges of the moveable sub-board (20), respectively, so as to help the sub-board (20) engage in the flutes (12), and a plurality of hollows (23) are provided on a backside of the short edges of the moveable sub-board for engaging in one of the detent member (30) when the sub-board (20) is sliding to a proper position; and
   wherein, after the sub-board is turned for 180° clockwise or counter clockwise, the rows of the sub-board (20) are aligning to those rows of the motherboard (10) which were covered before the sub-board (20) is turned.

2. The Braille writing device capable of processing information as defined in claim 1, wherein four poles (14) configured to hold Braille paper are provided respectively at four corners of a front side of the motherboard (10).

3. The Braille writing device capable of processing information as defined in claim 1, wherein each of the detent members (30) comprises an opening (31) formed on the motherboard (10), a ball (32) filled into the opening (31), a spring (33) arranged behind the ball, and a plate (34) positioned behind the spring to seal the opening (31), wherein a diameter of the opening (31) is slightly smaller than that of the ball (32) so that the ball (32) can be partially extended from the opening (31) by a force of the spring (33) to embed into one of the hollows (23) of the moveable sub-board to hold the moveable sub-board when the moveable sub-board (20) is sliding to a proper position.

\* \* \* \* \*